Aug. 4, 1942.   W. A. SANDBERG   2,291,763
MANHOLE STRUCTURE
Filed April 3, 1939

WILLIAM A. SANDBERG
INVENTOR

ATTORNEY

Patented Aug. 4, 1942

2,291,763

UNITED STATES PATENT OFFICE 2,291,763

MANHOLE STRUCTURE

William A. Sandberg, Los Angeles, Calif.

Application April 3, 1939, Serial No. 265,670

3 Claims. (Cl. 220—46)

The object of the invention is to provide a manhole closure for tanks and other vessels containing fluids under pressure; a closure which can be constructed at a reduced cost, which is readily and quickly opened and closed, in which the gasket is self-tightening as the pressure increases but is free from danger of leakage at low pressures, and, in the preferred form, a manhole closure in which the use of bolts or their equivalent is avoided.

A preferred form of the structure is illustrated in the attached drawings and the following description thereof, in which.

Figure 4:
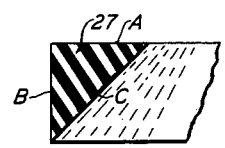
Figure 5:
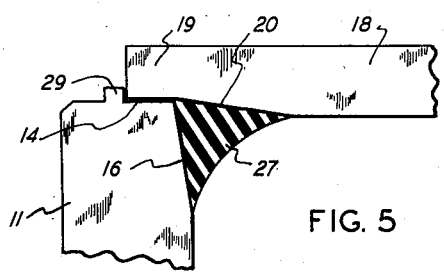
Figure 3:
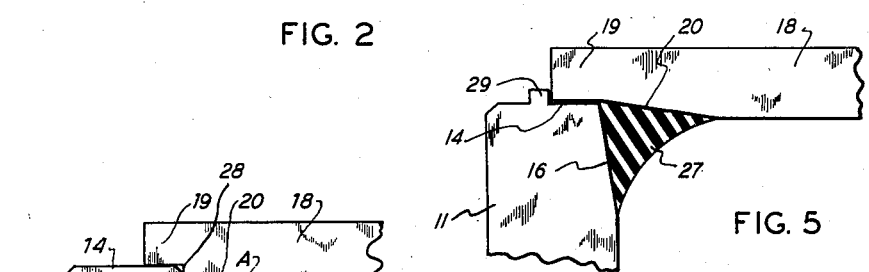

Fig. 3 is a fragmental section on an enlarged scale of the joint between ring 11 and plate 18 in which gasket 27 is retained;

Fig. 4 is a fragmental view of the gasket prior to its deformation in use;

Fig. 5 illustrates a slight modification of the form of the parts shown in Fig. 3.

Referring to the drawing, 10 is a portion of any shell in which the manhole may be placed, and 11 is the manhole ring, of suitable metal such as flange quality steel. The ring projects inside the shell and is welded thereto, inside and outside, as at 12 and 13. The upper face 14 of the ring is faced flat and square with the axis and the inner face of the ring is circumferentially recessed for the reception of a gasket, this recess having a slight shoulder 15 and the two faces 16 and 17 arranged more or less as shown in Fig. 3.

A cover plate 18 is provided with a circumferential lip 19 arranged to rest on the upper face 14 of the ring. The contacting faces of the ring and the lip do not form a joint and need not be ground, grooved, or otherwise prepared for the reception of a gasket or the forming of a leak-tight joint. Back of the lip the lower outer edge of the plate is chamfered as at 20, this chamfer terminating in a narrow shoulder 21. The bevelled edge of the plate, together with recess 15—16—17 form, when the plate is in place, a gasket receiving groove of which the two faces 16 and 20 are formed at an angle substantially narrower than a right angle, the exact angle of the narrow face 17 being immaterial.

Figure 1:
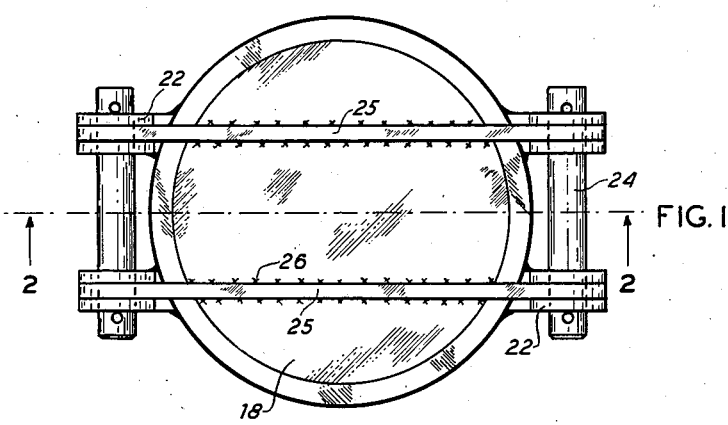
Fig. 1 is a plan view of the manhole assembly.
Figure 2:
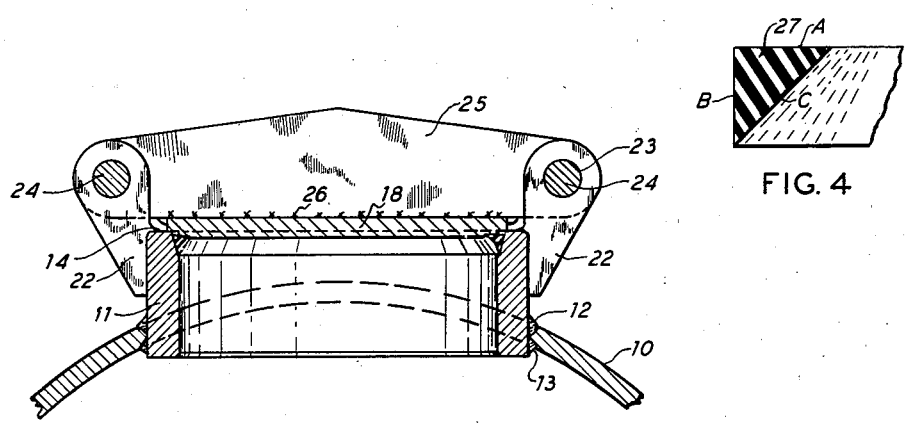
Fig. 2 is a vertical center section through the assembly, as on the line 2—2 of Fig. 1.

The cover plate 18, if sufficiently stiff, may be held down by a temper screw and bar of conventional design or by one or more of the hinged bars shown in Figs. 1 and 2, but I prefer the use of the holding-down means shown in these figures, in which two parallel bars are used. In this structure, four yoke lugs 22 are welded to the exterior of ring 11 and are drilled as at 23 to receive hinge and locking pins 24—24. Two bars 25—25 are tack-welded or otherwise lightly fastened to the upper surface of the plate, as indicated at 26, and are drilled at their ends to receive pins 22. When both of the pins are in place the plate should be resting on or very closely approached to upper ring face 14, but there should be sufficient slack to allow the pins to be freely withdrawn. When either pin is removed the other may act as a hinge on which the plate may be swung back to leave the manhole opening clear; thus either pin may be the hinge pin or the locking pin according to the direction in which it may be more convenient to swing the cover plate.

The ring gasket 27, of which a fragment is shown in Fig. 4 in the form which it takes when not in use, is in section substantially a right angled triangle. That is to say, its faces A and B should meet at a right angle or at an angle materially more obtuse than the meeting angle of ring face 16 with plate face 20. The face C may be straight in section or it may be slightly curved inwardly or outwardly. The circumference of this ring gasket should be substantially equal to the circumference of the bottom of the ring recess, i. e., the juncture of faces 16 and 17.

The gasket is formed of any resilient material suited to the fluid to be retained, for example of semi-soft rubber for water or steam or a synthetic rubber substitute for gasoline or other oily liquids or vapors destructive to rubber. It should be homogeneous and preferably free from nonresilient material such as canvas, cords, wire, or hard rubber. Being a continuous ring it may be sprung into place in the recess 15—16—17 before the cover plate is applied and will be firmly retained, assuming more or less the sectional form indicated by dotted lines A—C in Fig. 3. On then placing plate 18 and pressing it downwardly until the lip contacts face 14, the gasket will be further deformed and will form a joint between ring 11 and plate 18 which is tight against the first and lowest pressure which develops within the tank. As the tank pressure increases, the gasket is wedged more and more tightly into the retaining groove by the action of the fluid pressure on its free face C and thus resists leakage up to any pressure for which the metallic part of the structure is designed.

While the form of joint shown in Fig. 3 is that which I prefer to use in actual practice, certain of the details there illustrated are optional, at least in the sense that they may be omitted or modified without destroying functionality.

For example, the gasket ring is positioned and retained substantially by the tapered internal face 16, and the shoulder indicated at 17 in Fig. 3 serves the two minor purposes of preventing the gasket from being unseated if it should stick to the plate when the latter is raised and of leveling the upper face of the gasket. The shoulders 15 and 21 serve to bring the immediate edge of the gasket into line contact with metal, to make tightness more certain at low pressures, and to protect the machined faces 16 and 20 from accidental damage. These elements may therefore be omitted from the structure, with possibly some abatement of its efficiency, the joint then taking the form shown in Fig. 5 in which the bevel 20 is continued to the edge of the plate. In this form the shoulder 28 of Fig. 3, which acts solely for centering the plate, may be replaced by a rib or a succession of bosses 29 formed on the upper face of the manhole ring.

It is the particular advantage of the structure above described that it may be designed for working pressures only. In the conventional type of manhole, in which tightness is ensured by compressing a gasket, of whatever form or material, between two surfaces, the holding-down bolts have to be stressed sufficiently to resist the hydrostatic force exerted on the exposed edge of the gasket by the test pressure, which is usually one and one-half to two times the allowable working pressure, and must maintain an excess pressure on the contact surface. If the bolts are not loosened after the test, they will have this excess stress locked up in them, and in any case the requirement for maintaining a firm grip on the gasket requires a cross section of bolt which is grossly disproportionate to the actual working pressure requirement. This exaggerated bolt section is, of course, reflected in the necessity for an unduly heavy ring which adds materially to the cost of the structure. Further, the bolts, being located outside of the gasket, add to the bending moment in the cover plate, requiring a heavier plate. In the combination here described the only force required to seat the plate on the gasket is that necessary to slightly deform the resilient ring, a pressure which may be exerted by the hand, and thus the strength of the holding-down elements is governed solely by considerations of maximum internal pressure and safety factor.

Added advantages of the structure shown in Figs. 1 and 2 are speed of opening and closing, and insurance against premature opening. As to the first, the mere withdrawal of one of the pins permits the cover plate to be swung back on the other, exposing the entire opening without the use of tools and in an instant of time. The opening and closing operation may be repeated many times without damage to the gasket. As to the second, it will be evident that the pins are in shear so long as any fluid pressure is being exerted on the lower side of the plate and cannot be withdrawn until this pressure is entirely relieved. Thus the risk which attends the loosening of holding-down bolts prior to complete release of pressure is avoided.

I claim as my invention:

1. In a manhole closure having a metallic manhole ring and a cover plate therefor: an internal, upwardly flaring face formed adjacent the upper end of said ring; an internal shoulder projected over the wider end of said flare; a resilient gasket ring having normally a substantially triangular section, the outer and upper faces of said ring forming approximately a right angle, said gasket ring being retained in light compression by said flaring face and said shoulder, the upper face of said gasket ring projecting inwardly beyond said shoulder; a bevelled face formed on the lower side of said plate and adapted to contact only the projecting portion of said gasket ring, and manually movable means for holding said bevelled face in light compressive contact with said projecting portion.

2. In a manhole closure, a metallic ring adapted to project through and be nonleakably affixed in the wall of a metallic vessel, said ring having adjacent its upper end an internal, upwardly flaring face; a cover plate having a circumferential lip adapted to rest on the upper end of said ring, the lower face of said plate within said lip being circumferentially bevelled, the face of said bevel and said flaring face meeting at an angle substantially less than 90°; a resilient ring gasket adapted to enter the flared portion of said ring, the outer and upper faces of said gasket forming normally an angle substantially more obtuse than said meeting angle, and means for holding said cover plate in metallic contact with said metallic ring and simultaneously in light compressive contact with said gasket ring, last said contact being effected only within the inner boundary of said metallic ring.

3. In a manhole closure having a metallic manhole ring, said ring having an end face substantially normal to the axis of said ring and an outwardly flaring internal taper face substantially adjacent said end face; a resilient ring gasket of substantially triangular section fitted within said metallic ring with its outer face contacting said internal taper, the body of said gasket projecting internally from the inner wall of said metallic ring, and a cover plate so formed as simultaneously to contact said ring end face and the upper face of only the internally projecting portion of said gasket.

WILLIAM A. SANDBERG.